United States Patent
Deneen

[11] 4,028,251
[45] June 7, 1977

[54] AGITATOR FOR SOLIDS-CONTAINING VESSELS

[76] Inventor: William Deneen, 306 E. Forest St., Marengo, Ill. 60152

[22] Filed: Oct. 14, 1975

[21] Appl. No.: 621,849

[52] U.S. Cl. .............................. 210/280; 210/269; 259/4 R
[51] Int. Cl.² ........................................ B01D 27/12
[58] Field of Search ............... 259/4 R, 72, 3, 81 R, 259/89, 90, 12, 13, 14, 18, 29, 30, 36; 210/269, 280, 282, 275, 276; 220/71; 138/40

[56] References Cited
UNITED STATES PATENTS

| 274,902 | 4/1883 | Breer | 259/89 X |
| 1,203,007 | 10/1916 | Kegler | 220/71 |
| 1,443,500 | 1/1923 | Phillips | 220/71 X |
| 1,940,752 | 12/1933 | Holmquist | 259/89 |
| 3,815,752 | 6/1974 | Hoffman et al. | 210/282 X |

Primary Examiner—Philip R. Coe
Attorney, Agent, or Firm—Sherman & Shalloway

[57] ABSTRACT

A solids-agitating insert for double-ended, invertible tanks including flexible X-members the ends of which are flexed together for insertion through one end-aperture of the tank and retained in the tank when the ends are allowed to spring outwardly within the tank.

9 Claims, 4 Drawing Figures

AGITATOR FOR SOLIDS-CONTAINING VESSELS

BACKGROUND OF THE INVENTION

The present invention relates to agitators for solids-containing vessels and is concerned, more particularly, with agitators for invertible, double-ended tanks for liquid-treatment systems in which the tank is reverseable in position for regeneration and further service.

BRIEF DESCRIPTION OF THE PRIOR ART

The size and cost of water-treatment units for small businesses, such as restaurants, makes it necessary to have the units as simple as possible in order both to be competitive in price and to be simple enough in maintenance as to maintain satisfaction on the part of the customer.

Therefore, previous units have included such items as automatic regeneration valves and efforts as periodical replacement of interchangeable service tanks, which are then regenerated, in banks or sets, at a remote service installation.

However, the most advantageous of the prior systems includes a solids-retaining vessel which is provided with similar, quickly-connectable couplings at both ends, so that regeneration, including release of deposited matter, is easily accomplished by reversing the solids tank and flushing the solids in a reverse direction for a known period of time with a known amount of regenerating reagent. The reverse-flush effluent is simply dumped to waste during the fixed period, after which the vessel is again placed on stream for the treatment of further water.

A particularly suitable form of tank and system for this type of service is disclosed in U.S. Pat. No. 3,109,810, which issued Nov. 5, 1963 to James R. Krueger. The tank rests on a base member which cooperates with the quick-connect fittings located at the ends of the tank, and receives raw water via a compatible, quick-connect fitting.

As discussed in the Krueger patent, the periodic inversion of the solids vessel is intended to be beneficial not only because it tends to back-flush silt and deposited material from the former inlet face of the granular bed, but also because it tends to redistribute the solids into a new homogenous mass each time the tank is inverted.

This hoped-for result in the Krueger structure has been found to be true under optimum conditions. However, under conditions which are less advantageous, it has been found that an accumulation of silt or solids will not readily release from the interstices of the solids of the bed, but will stick and bridge between the particles of the bed and cause the solid bed to move like a solid plug or piston upon its inversion.

More importantly, this interstitial plugging of the bed forces the water traversing the bed to pass through the zones of least resistance and, therefore, aggravates channeling of flow and unequal regeneration of the solids. Further, there is the possibility that the plugging silt may subsequently release from the solids bed after the regeneration period and when the unit is in service.

There is opportunity, during inversion of the tank, to break up the clogged or silted zone mechanically, such as with a rod or stick, but this extra step is easily forgotten or may even be detrimental, particularly when the tanks are formed of fiberglass or a similar material.

Therefore, a need remains for a simple means for disrupting the mechanical composition of such beds and to rearrange the solids of the bed automatically in conjunction with the inversion of the tank.

Accordingly, prior solids tanks for this service have not been found to be entirely satisfactory in all circumstances.

SUMMARY OF THE INVENTION

In general, the preferred form of agitator of the present invention includes a plurality of rod elements secured to each other intermediate their lengths so that they form at least one X-shaped insert having diverging ends which approach and terminate adjacent opposite inner portions of a tank wall.

Preferably, the rod elements are sufficiently flexible to permit temporary distortion or flexing along their lengths and toward each other to facilitate insertion of the agitator into existing tanks and their retention of a proper position in the tank after insertion.

Accordingly, the preferred method for modifying reversible solids-containing tanks includes the steps of flexing the ends of a flexible X-shaped agitation member; inserting the flexed agitation member through an opening into the tank, and releasing the flexing pressure from the ends of the agitation member to permit the ends to flex away from each other within the tank.

OBJECTS OF THE INVENTION

It is an object of the present invention to provide an automatic agitator for double-ended, reverseable, solids-containing vessels.

It is another object of the present invention to provide an automatic agitator for conversion of reverseable, double-ended tanks to make them self-agitating with regard to solids therein upon reversion of the tank.

It is a further object of the present invention to provide an agitator which is insertible into tanks for containing solids and which have narrow fluid apertures in each end of the tank.

It is a further object of the present invention to provide an agitator for loose solids which is insertible into tanks having a body portion of a first cross-sectional area through a fluid aperture of a cross-sectional area substantially smaller than that of the body portion.

It is a still further object of the present invention to provide an agitator for loose solids which is formed of crossed rods in an X relationship and which are flexible to permit their temporary flexure and insertion through a narrow aperture and their subsequent return toward their original shape within a larger portion of the tank having the fluid aperture therein.

It is yet a further object of the present invention to provide an agitator for loose solids which is formed of crossed flexible rods forming an elongated X member, the rods being flexible to permit insertion of the X member into a vessel via a narrow aperture and to position the agitator within the vessel by engagement with a portion of the vessel wider than the aperture.

It is a particular object of the present invention to provide an agitator for loose solids which is insertible into standard reverseable tanks for use in the solids-contact treatment of liquids.

It is another particular object of the present invention to provide an agitator for loose solids which includes an X member insertible through a fluid aperture into a standard reverseable tank for use in the solids-contact treatment of liquids.

It is a further particular object of the present invention to provide an agitator for loose solids in a non-metallic, reverseable tank for solids-contact treatment of water and which includes an X member formed of rods sufficiently flexible to permit insertion of the X member into the tank via one of the narrow fluid apertures at the ends of the tank.

BRIEF DESCRIPTION OF THE DRAWINGS

These and other objects of the invention and a better understanding thereof may be derived from the following description and accompanying drawings, in which.

DETAILED DESCRIPTION OF THE PREFERRED EMBODIMENT

Figure 1:
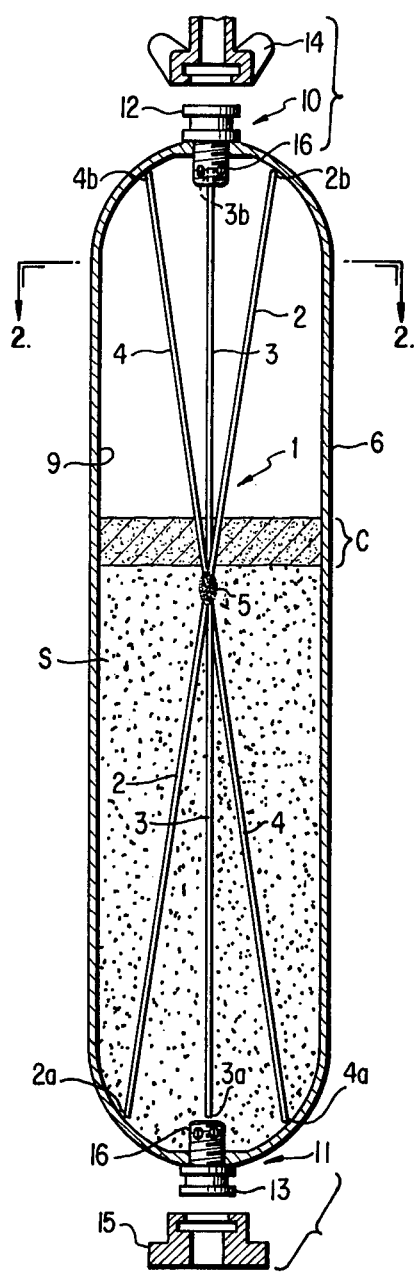
FIG. 1 is a sectional side view of the preferred embodiment.
Figure 2:
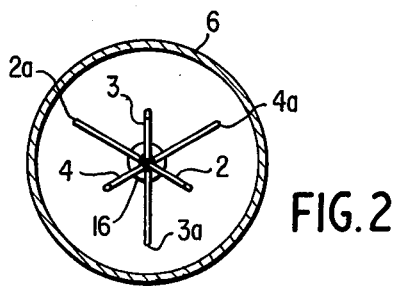
FIG. 2 is a cross-sectional view taken along lines 2—2 of FIG. 1.

As shown in the drawings, the preferred form of agitator 1 of the invention includes a series of inert or corrosion-free rods 2, 3 and 4 which are crossed at a crossing point about their mid-point and there secured to each other, as by a weldment 5, to form a plurality of X-shapes having the free ends of the rods splayed at about 120° from each other and spaced apart a distance sufficient to abut or rest against a wider, inner portion of a vessel or tank 6 into which the agitator member is to be installed. The portions of separate rods form obtuse angles with one another on opposite sides of the crossing point.

The rods preferably are formed of a metal or a plastic material. It is to be understood that as few as two rods may be employed, to form a simple-X agitator, or more than three rods may be employed, if desired.

Where it is to be used with a tank that includes an open-ended step in its fabrication steps, the agitator member may simply be inserted therein during the fabrication step during which one of the ends is open.

However, the present invention is primarily concerned with the use of standard tanks or vessels and their economical conversion, rather than costly interruption and modification of their standard production procedures.

Accordingly, it is particularly advantageous to form the agitator member of rods which are capable of transverse flexing along their length.

Figure 3:
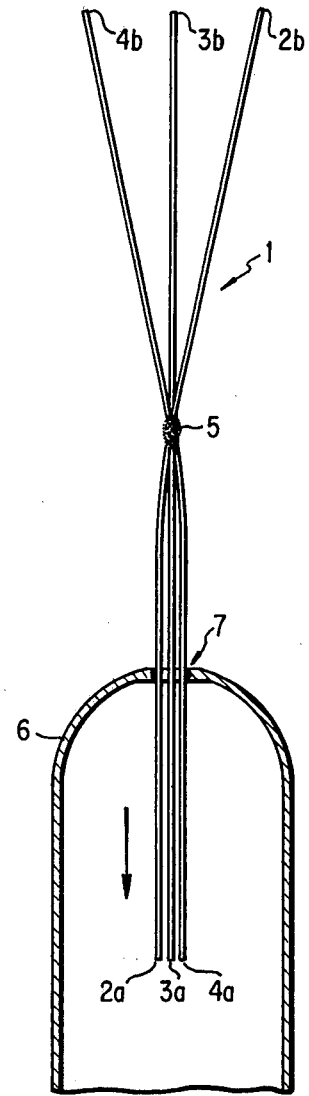
FIG. 3 is a partial view similar to FIG. 1 and showing the first step of insertion of the preferred agitator.
Figure 4:
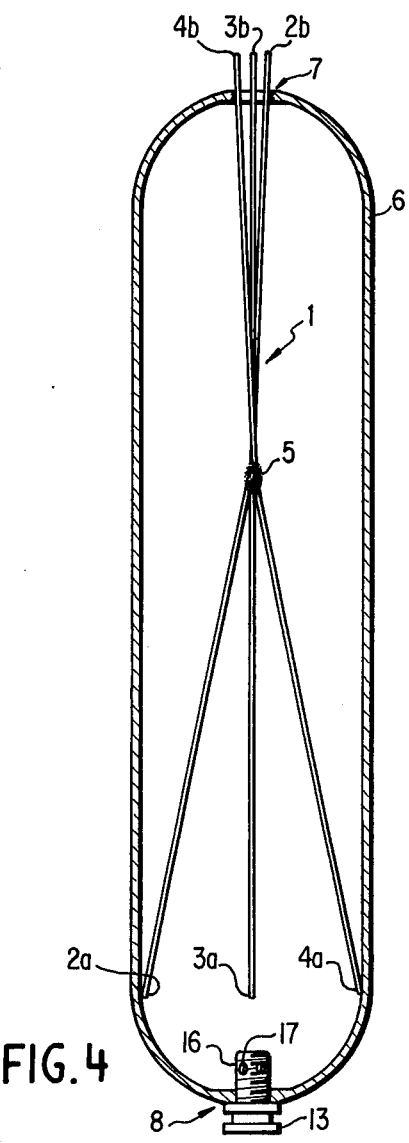
FIG. 4 is a view similar to FIG. 3 and showing the second stage of insertion.

The preferred method of insertion of the preferred agitator member is best shown in FIGS. 3 and 4, in which the pre-formed, double-ended tank, which has combined inlet/outlet apertures 7 and 8 of considerably smaller cross-sectional area at its opposite ends, is modified by the insertion.

As shown in FIG. 3, a first group of rod ends, 2a through 4a, are flexed toward each other sufficiently to enter the aperture 7, which is free of any accessories formerly present or subsequently to be installed.

Thereafter, the agitator assembly 1 is pushed further into the tank 6 until the opposite ends 2b–4b of the rods 2–4 are flexed toward each other by the aperture 7, as shown in FIG. 4. In this position, the first-introduced ends 2a, 3a and 4a have been freed to spring toward the inner wall 9 of the tank 6, but are free to slide therealong as the assembly is introduced further into the tank.

When the second ends 2b to 4b clear the inner portion of the aperture 7, those ends are then released to spring outwardly to the position shown in FIG. 1.

Assembly of the tank is then completed by the attachment of upper and lower fittings 10 and 11 which include quickcouplings 12 and 13, respectively, for closure with an inlet connector 14 and an outlet connector 15. Preferably, the fittings 10 and 11 each include a distributing unit or screen 16 having apertures 17 to distribute incoming raw water, when serving as the inlet, and to screen solids from loss, when serving as the outlet.

After one of the fittings 10 or 11 has been installed, the tank may be filled with water-treating solids, such as zeolite, before the second fitting is installed.

OPERATION OF THE PREFERRED EMBODIMENT

In operation of a tank modified by installation of the preferred form of agitator member of the invention, the tank is installed in the treatment system by coupling to the twist-connectors 14 and 15, and is then placed on stream to treat the raw water served by the system.

After continued use, during which the water-treating capability of the zeolite or similar material is depleted and a clogged or silted zone C is developed by deposition of silt or minerals in the interstices of the face of the solids bed, the system is shut down for regeneration.

The fitting 10 of the tank is then isolated from the inlet connector 14 and the tank is drained via the outlet connector 15. When drained, the fitting 11 of the tank is disconnected from the outlet connector 15; the tank is inverted, and previously-uppermost fitting 10 is then secured to the outlet connector 15.

A requisite amount of regenerating agent, such as common salt or a brine solution in the case of zeolite, is then introduced into the tank via the opened aperture 8 (now upper-most); the fitting 11 is re-installed; the inlet connector is joined to the tank via fitting 11, and water is supplied therethrough to flush the reagent through the bed of solids to a waste drain for a time sufficient to regenerate the solid agent in the tank before the tank is returned to service.

Either during inversion of the tank or upon application of water pressure via the fitting 11, the bed of solids moves downward from adjacent the tank-end having the aperture 8 and passes toward the (now lowermost) tank-end having the aperture 7.

Whether it descends by gravity, during inversion, or by gravity and pressure, after the supply of flushing water, the arrangement of the solids in the bed is disturbed and redistributed by the presence of the agitator member 1.

To begin with, the portions of the rods 2, 3 and 4 intermediate the weld 5 and the ends 2b, 3b and 4b, act as knifing members which enforce gradually radially-widening slits outwardly in the silted zone C and, thereafter, in the portion of the main bed of solids which passes until the bed comes to rest against the tank end having the fitting 10.

Also, the portions of the rods 2, 3 and 4 intermediate the weld 5 and the ends 2a, 3a and 4a cut slits which widen inwardly in the previously-lower region of the inverted solids bed as it descends to form the new upper surface for water incoming from the inlet connector 14.

Thus, the agitator member enforces a disruption of the inverted solids bed and, at the same time, permits resettlement of the bed to its desired, new position. Furthermore, the agitator enforces disruption of the clogged or silted zone, thereby providing for dispersement of the formation and precluding bridging of the silt material or channeling through either the silt zone or the main body of the solids.

Therefore, the silted zone is broken up and thoroughly exposed to the flushing action and the reagent matter of the regenerating flow, thereby facilitating the thorough, uniform reactivation of the solids bed.

Accordingly, the present invention provides for the automatic agitation and redistribution of the solids in invertible tanks simply by the inversion thereof and without additional attention or effort by the attendant and without complex or delicate apparatus.

Therefore, it is apparent that the present invention provides a particularly advantageous agitator member for standard reversible tanks of materials such as fiberglass and a similarly advantageous method for the modification of such reversible tanks to make them self-agitating in service.

Various changes may be made in the details of the invention, as disclosed, without sacrificing the advantages thereof or departing from the scope of the appended claims.

What is claimed is:

1. An agitator for installation in a tank having opposite ends and containing loose solids comprising:
   a. at least two rods,
   b. means for securing said rods to each other at a crossing point intermediate their lengths to form
   c. a cross member having portions extending toward the opposite ends of the tank in substantially opposite directions from the crossing point, wherein the portions of separate rods form obtuse angles with one another on opposite sides of the crossing point,
   d. means of positioning said cross member in said tank, said positioning means including
   e. free rod ends at each end of said cross member and spaced from each other a normal distance sufficient to abut an internal portion of the tank adjacent opposite ends of the tank.

2. An agitator according to claim 1 in which said rods are flexible to a dimension smaller than said normal distance.

3. An agitator according to claim 2 in which said rods are metal.

4. An agitator according to claim 2 in which said rods are formed of synthetic material.

5. An agitator according to claim 2 in which said agitator includes three rods and the rod ends are substantially equidistantly spaced from each other.

6. A tank comprising:
   a. a body having a first cross-sectional area and
   b. at least one fluid aperture of smaller cross-sectional area,
   c. retaining means at said fluid aperture for retaining a bed of loose solids in said tank, said retaining means including
   d. a removable member,
   e. an agitator member comprising:
   f. at least two rod members each having two free ends,
   g. means for securing said rod members to each other at a crossing point intermediate their free ends to form
   h. at least one cross member having portions extending toward opposite ends of the tank with the portions of separate rods forming obtuse angles with one another on opposite sides of the crossing point, adjacent rod ends of said cross member normally being spaced from each other a distance greater than the largest dimension of said fluid aperture, and said rod members being sufficiently flexible to permit flexure of said free rod ends to a dimension less than a dimension of said fluid aperture.

7. The apparatus of claim 6 in which said tank is elongated and includes a fluid aperture at each end.

8. The apparatus of claim 7 in which said tank is non-metallic.

9. The apparatus of claim 8 in which said tank is formed of fiberglass.

* * * * *